(12) United States Patent
Polignone

(10) Patent No.: US 12,233,290 B2
(45) Date of Patent: Feb. 25, 2025

(54) MULTI-LAYER FACE MASK

(71) Applicant: NuGeneration Technologies, LLC, Emeryville, CA (US)

(72) Inventor: Donato Polignone, Emeryville, CA (US)

(73) Assignee: NuGeneration Technologies, LLC, Emeryville, CA (US)

( * ) Notice: Subject to any disclaimer, the term of this patent is extended or adjusted under 35 U.S.C. 154(b) by 1001 days.

(21) Appl. No.: 17/220,772

(22) Filed: Apr. 1, 2021

(65) Prior Publication Data

US 2021/0308497 A1    Oct. 7, 2021

Related U.S. Application Data

(60) Provisional application No. 63/006,035, filed on Apr. 6, 2020.

(51) Int. Cl.
| | | |
|---|---|---|
| *A62B 18/02* | (2006.01) | |
| *A41D 13/11* | (2006.01) | |
| *A62B 27/00* | (2006.01) | |
| *B01D 39/08* | (2006.01) | |

(52) U.S. Cl.
CPC ............ *A62B 18/025* (2013.01); *A41D 13/11* (2013.01); *B01D 39/08* (2013.01); *A62B 27/00* (2013.01); *B01D 2239/065* (2013.01); *Y10T 442/3472* (2015.04)

(58) Field of Classification Search
None
See application file for complete search history.

(56) References Cited

U.S. PATENT DOCUMENTS

| | | |
|---|---|---|
| D712,097 S | 8/2014 | Sullivan, Jr. |
| 9,491,979 B2 | 11/2016 | Kim |
| 10,137,394 B2 | 11/2018 | Tong et al. |
| 2005/0133034 A1 | 6/2005 | Jensen |
| 2009/0078119 A1 | 3/2009 | Buckley |
| 2010/0307119 A1 | 12/2010 | Leung et al. |
| 2012/0030859 A1 | 2/2012 | Kroese et al. |
| 2014/0101822 A1 | 4/2014 | Womack |
| 2016/0015098 A1 | 1/2016 | Conlon |
| 2016/0213959 A1 | 7/2016 | Barklow |

(Continued)

FOREIGN PATENT DOCUMENTS

| | | |
|---|---|---|
| AU | 2013381874 B2 | 9/2014 |
| DE | 112010001912 B4 | 4/2019 |

(Continued)

OTHER PUBLICATIONS

Filterm, Columbus Filters, Webpage: https://filterm.pl/en/filtry-do-lakierni/columbus-multi-layer-paper-filters.

(Continued)

*Primary Examiner* — Arti Singh-Pandey
(74) *Attorney, Agent, or Firm* — Brian M. Kaufman; Robert D. Atkins; PATENT LAW GROUP: Atkins and Associates, P.C.

(57) ABSTRACT

A face mask has a first woven filter layer comprising a first yarn and a second woven filter layer comprising a second yarn. The second yarn is disposed at a non-right and non-parallel angle relative to the first yarn. The second woven filter layer is stitched to the first woven filter layer. A third woven filter layer with a third yarn can be added with the third yarn at a non-right and non-parallel angle relative to both the first yarn and second yarn.

20 Claims, 10 Drawing Sheets

(56) References Cited

U.S. PATENT DOCUMENTS

| | | | |
|---|---|---|---|
| 2018/0168258 | A1 | 6/2018 | Solle et al. |
| 2019/0290943 | A1 | 9/2019 | Heyer et al. |
| 2020/0009409 | A1 | 1/2020 | Crotty et al. |

FOREIGN PATENT DOCUMENTS

| | | | |
|---|---|---|---|
| KR | 20170099426 A | | 9/2017 |
| KR | 101954022 B1 | | 5/2019 |
| KR | 20200039958 A | | 4/2020 |
| WO | 2010023565 A1 | | 3/2010 |

OTHER PUBLICATIONS

Inversion Air Pollition Gaiter 2.0—Protect Your Lungs by jaMo Threads, 2017, Kickstarter, Webpage: https://www.kickstarter.com/projects/1943319285/inversion-air-pollution-gaiter-20-protect-your-lun.

Boegger Industech Limited, Plain Weave Sintered Square Woven Wire Mesh, Webpage: https://www.sinteredfilter.org/sinteredmetalfilter/plain-weave-sintered-mesh.html.

MULTI-LAYER FACE MASK

CLAIM OF DOMESTIC PRIORITY

The present application claims the benefit of U.S. Provisional Application No. 63/006,035, filed Apr. 6, 2020, which application is incorporated herein by reference.

FIELD OF THE INVENTION

The present invention relates to filter technology generally, and, more specifically, to multi-layer face masks for filtering pathogens.

BACKGROUND OF THE INVENTION

Face masks have become a part of daily life for millions of people. Face masks are used to block pathogens from the mask wearer escaping into the local environment and infecting other nearby individuals. Face masks also block pathogens from the environment landing on the wearer's face near the nose and mouth, where pathogen entry could infect the wearer. FIG. 1a shows an individual wearing a mask 10. Mask 10 includes a cloth filter layer 12 and ear straps 14. Filter layer 12 is placed over the nose and mouth, and straps 14 are placed around the wearer's ears to hold the mask in place.

One of the ways that filter layer 12 works is by allowing air, but not pathogens, through the filter layer when a person breathes. FIG. 1b shows a magnified view of filter layer 12. Filter layer 12 is a woven filter, consisting of a plurality of warp yarns 20 and a plurality of weft yarns 22 woven together. The term yarn refers to anything used to make a weave, e.g., thread, string, or wire. The positioning of the warp yarns 20 and weft yarns 22 leaves openings 24 between the yarns. The specific type and size of thread used for warp yarn 20 and weft yarn 22 is selected to form small enough openings 24 that pathogens 26 can get trapped on the woven fabric of filter layer 12 rather than being breathed through openings 24.

However, openings 24 can only be made so small, and even the most effective filter layer 12 will have a certain number of pathogens 26 getting through the openings. In FIG. 1b, pathogens 26 are about the same size as openings 24 so some pathogens are stopped, and some get through based on random chance.

Some people have decided that, due to the fallibility of a single filter layer 12, wearing two mask layers at the same time would improve the total efficacy. FIG. 2a shows a person wearing two masks 10, resulting in a first filter layer 12a and second layer 12b covering the person's nose and mouth. Filter layers 12a and 12b can be two totally separate masks with separate ear straps 14a and 14b for each mask. Alternatively, two filter layers 12a and 12b can be built into a single mask with only a single pair of ear straps 14.

A magnified view of the dual filter layers 12a and 12b is shown in FIG. 2b. The problem with using two filter layers is that the openings 24a of first filter layer 12a can end up aligned with the openings 24b of second filter layer 12b. A pathogen 26 that makes it through an opening 24a in first filter layer 12a may end up also going directly through an opening 24b of second filter layer 12b.

Wearing a mask with multiple filter layers seems like a beneficial step to take but does not help as much as one might expect. Therefore, a need exists for improved multi-layer filter masks.

DETAILED DESCRIPTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
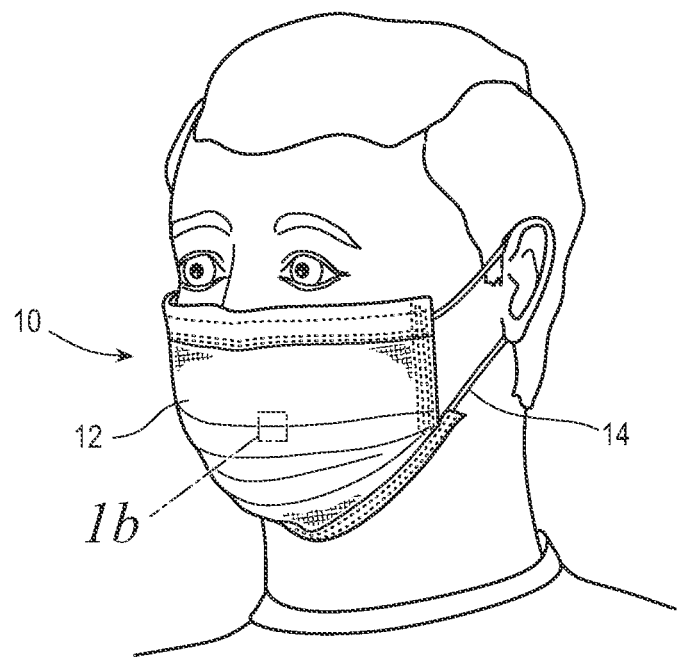
FIGS. 1a and 1b illustrate a filter mask.
Figure 1B:
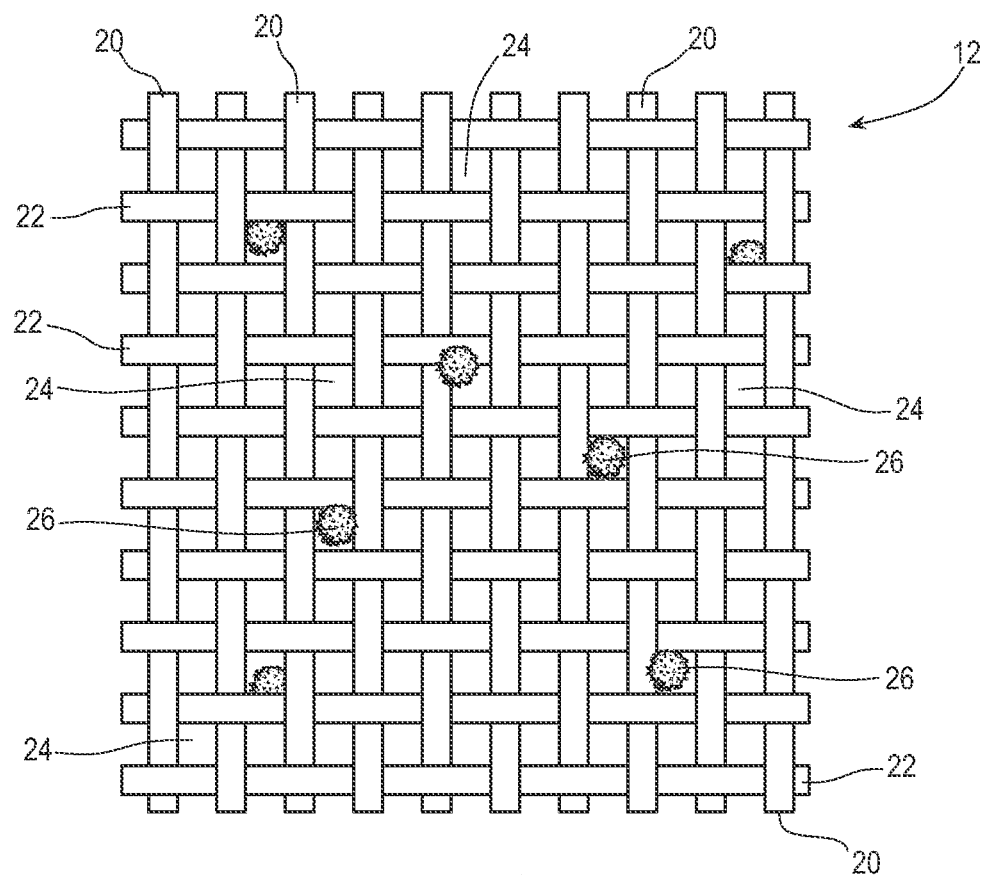
Figure 2A:
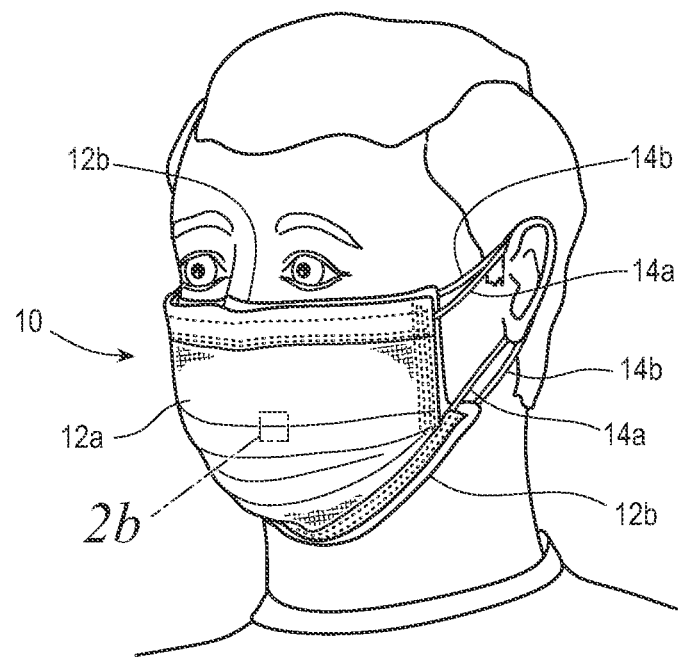
FIGS. 2a and 2b illustrate double masking.
Figure 2B:
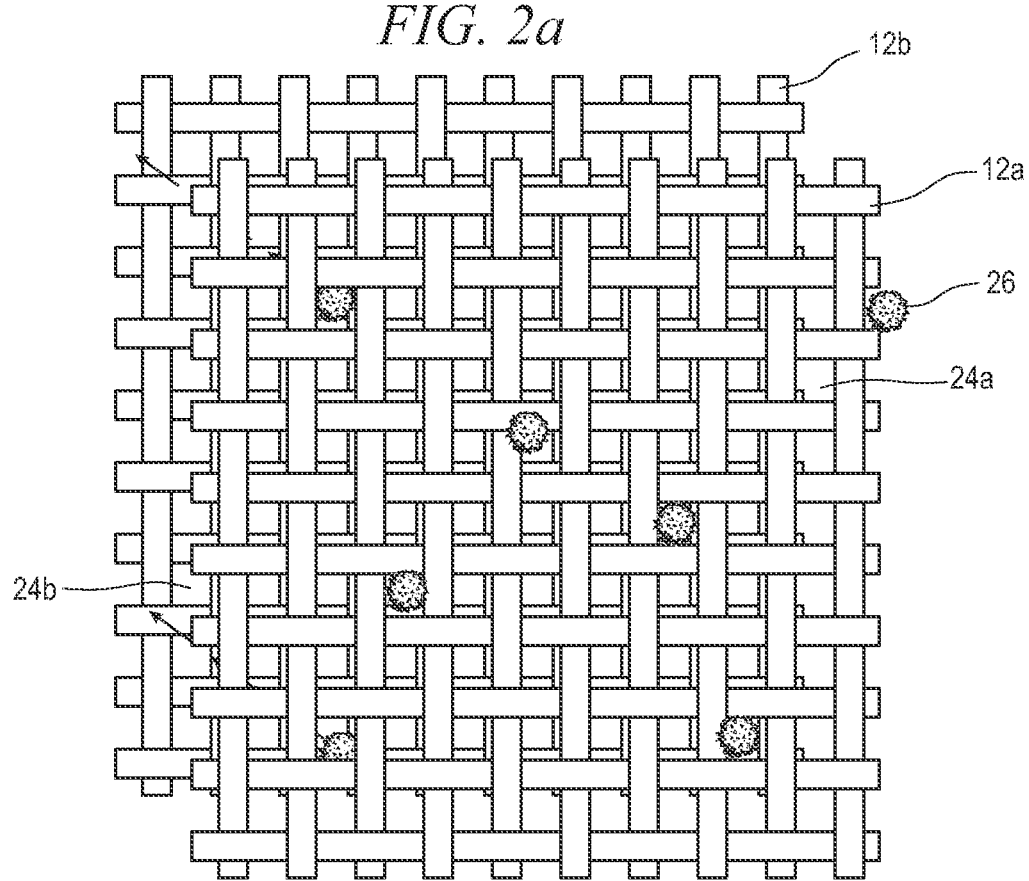
Figure 3A:
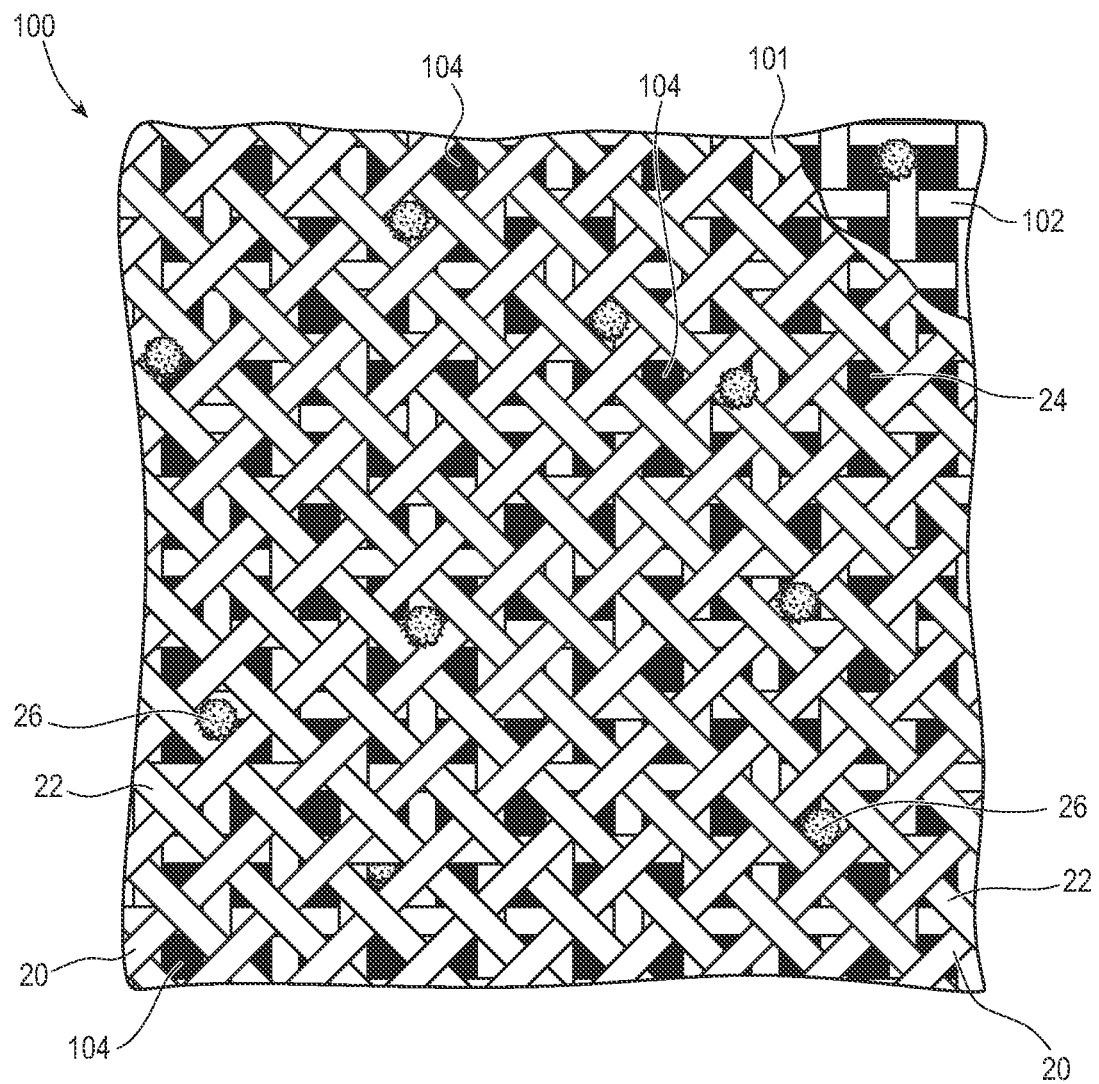
FIGS. 3a and 3b illustrate multi-layer masks with rotated layers.

As discussed above, one downfall of using multiple woven filter layers is that the openings of the weave can end up lined up between the multiple layers, largely eliminating the benefit of having more than one filter layer. FIG. 3a shows a mask 100 with two filter layers 101 and 102 being used in series. Mask layer used in series means that a person breathing pulls or pushes air through both layers one after the other in order to pass the air through the mask as a whole.

Filter layer 101 is turned 45-degrees relative to filter layer 102. While filter layer 102 has warp yarn 20 oriented vertically in FIG. 3a, the warp yarn of filter layer 101 is oriented at a 45-degree angle. The different angle between the two adjacent layers results in openings 24 of first layer 101 being distributed in a significantly different pattern from openings 24 of second layer 102.

Openings 24 of the two filters overlap in a highly irregular pattern to form combined openings 104 that are significantly smaller than openings 24 of either individual layer. FIG. 3a is drawn with a dark background so that combined openings 104 can be recognized by the areas where the dark background is visible through filter layers 101 and 102. Yarns 20 and 22 of filter layer 101 cut across openings 24 of filter layer 102, and vice versa. Filter layer 101 and filter layer 102 are disposed in physical contact with each other so that the yarns of each filter layer block a part of openings 24 of the other filter layer.

The angled distribution of adjacent filter layers 101 and 102 means that openings 24 of adjacent filter layers will not align perfectly for the entire mask. Openings 24 of first filter layer 101 will have a different spacing in any given direction compared to the openings of second filter layer 102 in the same direction. For instance, in the horizontal direction of FIG. 3a, openings 24 of first mask 101 are spaced out further apart than the openings of second mask 102. The spacing of the openings along any given axes are different so that the openings 24 of adjacent layers will not repeat on top of each other.

Even if one opening 24 of first mask 101 aligns perfectly with an opening of second mask 102, the coincidence will be limited to only a single opening. None of the adjacent openings 24 will be perfectly aligned with another opening of the other filter layer. Moreover, because the warp yarns 20 and weft yarns 22 of the two filters are at different angles, the yarns still cut off the corners of perfectly aligned openings 24. The result is that even perfectly aligned openings 24 form a smaller combined opening 104 than the individual openings.

Figure 3B:
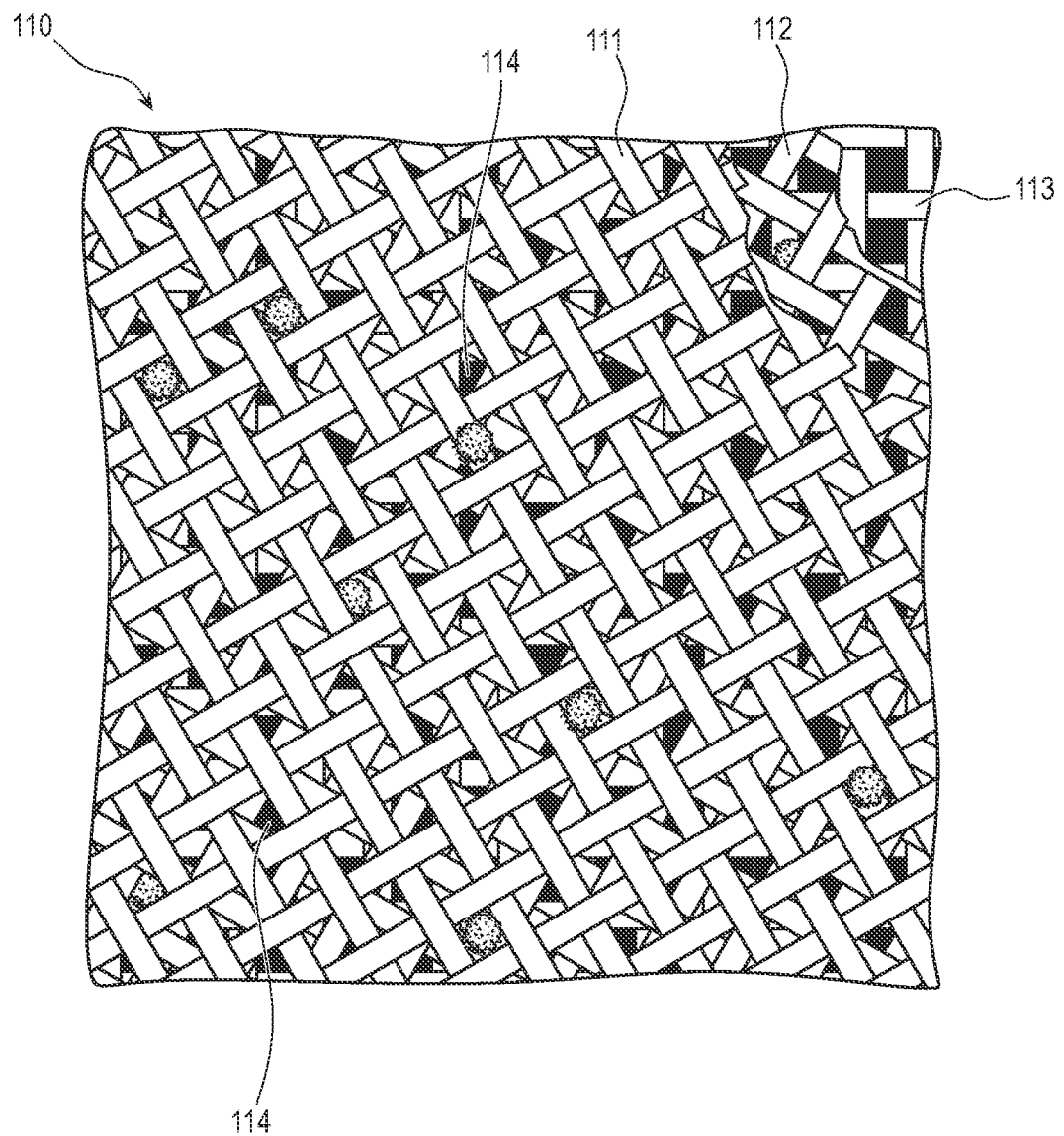

FIG. 3b illustrates a mask 110 with three filter layers 111, 112, and 113 being used in series. Each of the filter layers 111-113 is oriented at a different angle, with the angles being evenly spaced 30-degrees apart. The warp yarns 20 of second filter layer 112 have a 30-degree angular offset from the warp yarns of first filter layer 111. The warp yarns 20 of third filter layer 113 are offset 30 degrees from second filter layer 112 and 60 degrees from first filter layer 111.

Having three different filter layers oriented at three different angles results in openings 24 being even more irregularly distributed relative to each other for even smaller combined openings 114 on average relative to combined openings 104 in the dual-layered mask. In any given direction, the openings 24 of filter layers 111-113 have three different spacings. Filter layers 111-113 are set in physical contact with each other so that pathogens need to find a path through openings 24 of all three layers at once rather than being able to make it through all three filter layers one at a time individually.

FIG. 3a shows two filters with a 45-degree angle between the two layers. FIG. 3b shows three filters with a 30-degree angle between each adjacent layer. The commonality is that the angle between two adjacent layers is always 90 degrees divided by the total number of layers, i.e., each layer is rotated 90/X degrees where X is the total number of layers. 90 degrees is selected because for woven filters, rotating 90 degrees is largely equivalent to rotating 0 degrees. If the weave is square, openings 24 will align the same at 90 degrees as 0 degrees and so 90 and 0 can be considered the same angle. For rectangular openings 24 that are not square, 90 degrees is better than 0 degrees, but still not ideal.

Following the 90/X rule, a four-layer mask would have 90/4 or 22.5 degrees between each layer and a five-layer mask would have 90/5 or 18 degrees between each layer. The 90/X rule can be followed indefinitely for any arbitrary number of layers. However, as the angle between layers is reduced the likelihood of a pathway being formed through the mask by the weave openings through the layers increases.

The problem can be avoided in a number of ways. The previous examples suppose that each successive layer is turned 90/X degrees relative to the previous layer. One alternative is to randomize the order of the layers such that there is still one layer at each 90/X orientation, but the layers are not placed in order. That is, instead of having 5 layers in order at 0 degrees, 18 degrees, 36 degrees, 54 degrees, and 72 degrees, the order could be randomized, e.g., a 0-degree layer followed by a 54-degree layer, a 72-degree layer, a 36-degree, and finally an 18-degree layer. Any random or pseudo-random order could be used, and an optimal order may be revealed via the testing mechanism disclosed below and in FIGS. 6a-6c.

Another alternative is to use a constant offset angle between each layer for any number of layers. Instead of reducing the angle further as layers are added, the filter could simply be made with each adjacent layer having a fixed offset relative to the last, e.g., 30 degrees. Even though a fixed 30-degree offset between each adjacent layer would result in every fourth layer being at a 90-degree offset, the problem of layer alignment is reduced by having two intervening layers at angled offsets. The two 90-degree offset layers would not be directly adjacent as in the prior art.

Any number of filter layers could be stacked with any desired constant offset between adjacent layers. A 45-degree offset between layers would result in every other layer being aligned at 90-degree offset, but the intervening angled layer would still reduce the impact of alignment.

Adjacent layers can be disposed against each other with any non-right and non-parallel angle, i.e., warp yarns 20 of adjacent filter layers should form an angle greater than 0 degrees and less than 90 degrees. In one embodiment, warp yarns 20 of adjacent filter layers are disposed at an angle between 20 degrees and 45 degrees.

Figure 4A:
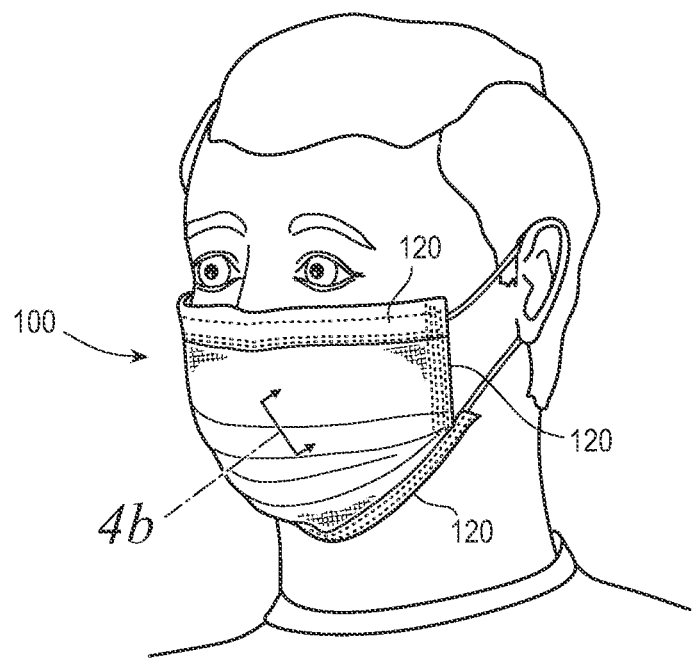
FIGS. 4a and 4b illustrate additional details of the multi-layered masks.

FIG. 4a shows a user wearing mask 100. Mask 100 includes stitching 120 around the edges of the mask to keep filter layers 101 and 102 properly positioned relative to each other. Stitching 120 includes thread that is extended through both filter layers 101 and 102 to hold the layers together. Mask 100 provides two filter layers that combine to filter pathogens better than a single layer would be capable of. Moreover, because there is an angular offset between the stitching of the two layers, the effectiveness of mask 100 is not reduced by the two weave patterns falling directly on top of each other and aligning perfectly.

Figure 4B:
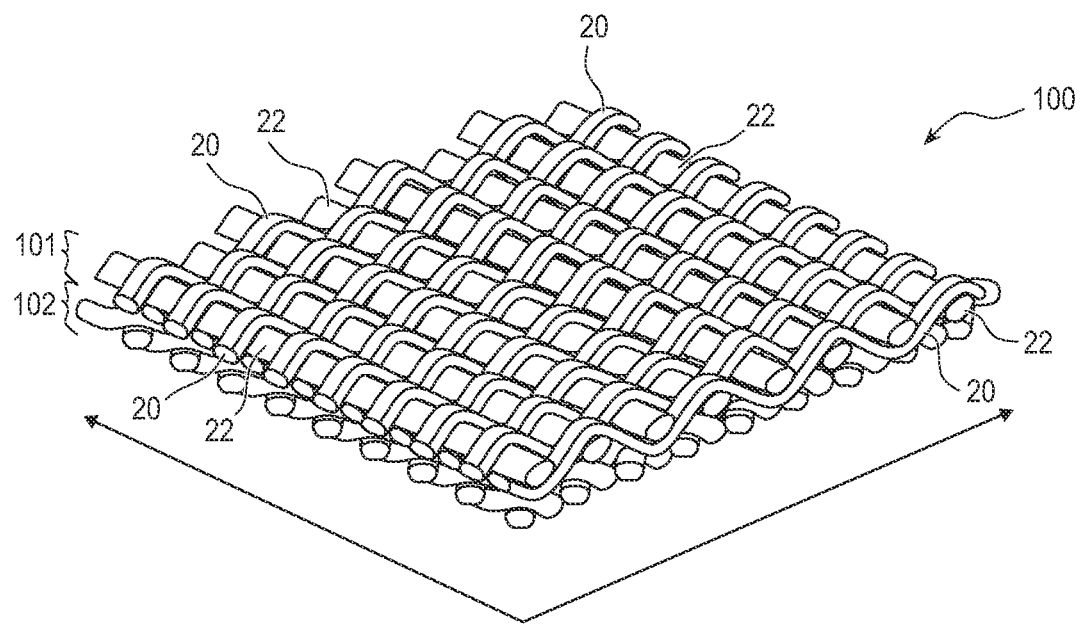

FIG. 4b shows a perspective view of a portion of filter layers 101 and 102. Warp yarns 20 of first layer 101 are angled 45 degrees relative to the warp yarns of second layer 102. Likewise, weft yarns 22 of first layer 101 are angled 45 degrees relative to the weft yarns of second layer 102. The 45-degree angle between layer improves effectiveness of mask 100, increases the percentage of pathogens being blocked by the mask, and overall improves the health and safety of the user.

The warp yarns 20 and weft yarns 22 can be formed of any suitable material. Flexibility in which material is chosen allows the manufacturer to save costs by selecting the cheapest material. A manufacturer could also go with a recyclable material, such as plastic, so that the masks can be recycled. Alternatively, a compostable material such as hemp could be used to further improve environmental impact. A plant-based plastic, such as polylactic acid (PLA), can be used to allow the masks to decompose on a much quicker timescale than traditional plastic. Any suitable yarn material, e.g., cotton, polyester, linen, metal, nylon, rayon, silk, or wool, can be used in other embodiments.

While a common disposable surgical mask is shown in FIG. 4a, the same angular offset filter principle can be used to form any mask type or form factor. The angular offset between layers can be applied to masks that fit tightly to the face such cone-style masks and the common N95 and KN95 masks available on the market. Angular offset filter layers can also be used within a cartridge, valve, or vent that attaches to or is part of the mask to filter air going into and out of the mask's inlet or outlet port. A cloth mask can be formed from the angled filter layers, or angled filter layers can be inserted into the pocket of a cloth mask to add improved filtration. A neck gaiter or balaclava can similarly be made from the angled filter layers or have angled filter layers inserted into a filter pocket.

Forming a filtered facemask with woven layers that have an angular offset between adjacent layers allows a mask to be made to any desired filtration standard with relatively cheap manufacturing costs. Any standard can be reached by simply stacking additional layers. Since all adjacent layers are disposed at a different angle from each other, the layers will not sit with their respective weave openings perfectly aligned.

While a mask for breathing is illustrated, the same filter concept can be used to filter air in other situations. Multi-layer filter media can be made with angled layers for filtering air in residential or commercial HVAC systems, combustion engine air intakes, vehicle cabin filters, and any other place where air filters are used. Additionally, other fluids such as water or oil can be filtered using filter media made with the same angled layers principle.

The benefit of having adjacent layers rotated to different angles is improved by having the two layers in direct physical contact so that the yarns of one layer partially block openings of the other layer. First layer 101 may be easily maintained in direct contact with second layer 102 for the entire area of mask 100 simply using stitching 120. However, other measures may be taken to ensure that the layers remain in contact.

Figure 5:
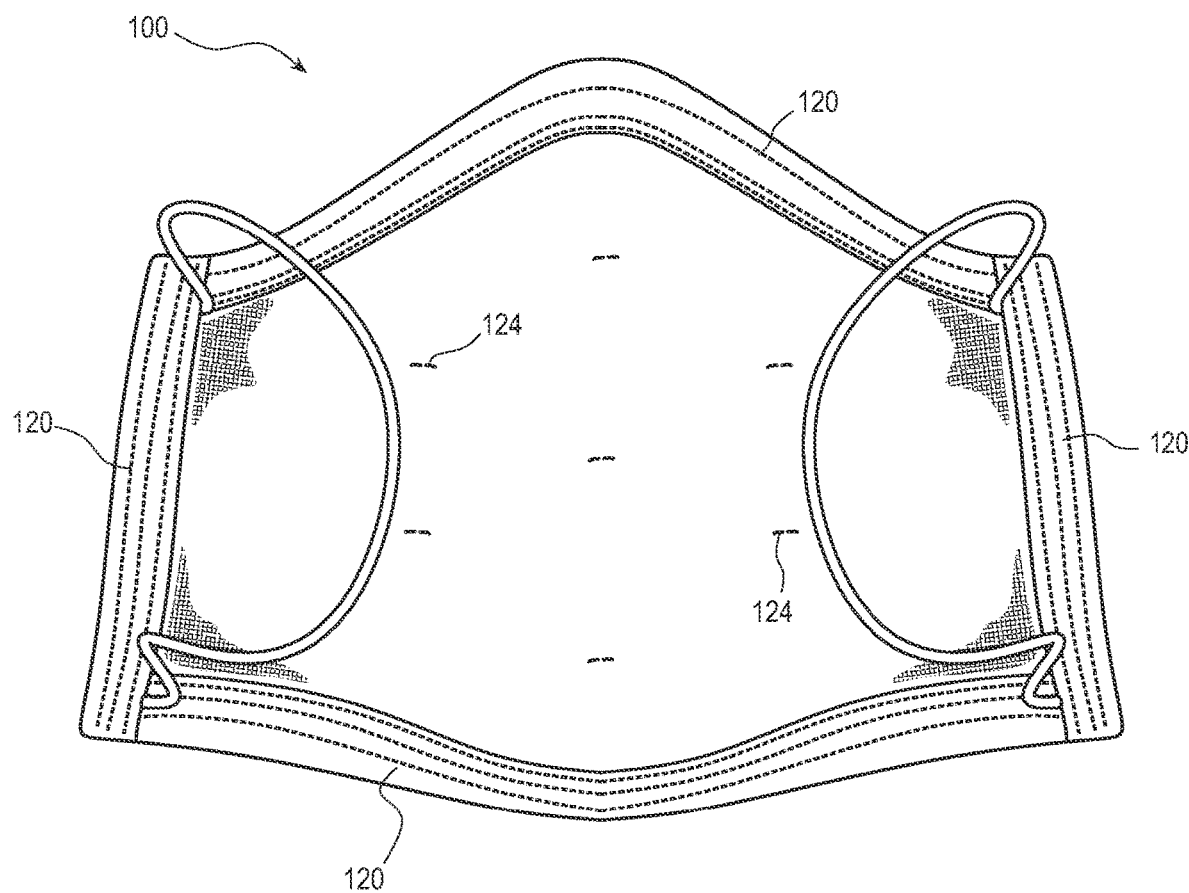
FIG. 5 illustrates keeping mask layers in contact using stitching.

FIG. 5 shows mask 100 with center stitches 124 added. Center stitches 124 are added to areas that may have trouble staying together during normal wear of mask 100. The stitches go through all mask layers and hold the layers together at the point of each stitch. The exact number and locations of center stitches 124 can be customized based on the specific mask design and where additional help is needed to keep mask layers together based on testing. In some cases, only a single stitch at the center of a mask will be sufficient. Filter layers can also be held together by a layer of adhesive between the filter layers, or simply a few spots of adhesive at key locations as with center stitches 124. In other embodiments, the pressure of air being pulled through mask 100 is enough to keep the filter layers together and no additional measures are necessary.

A mask can be made to any desired filtration specification by simply stacking rotated filter layers until the desired filtration level is achieved. Common filtration ratings are the NIOSH air filtration ratings from the U.S. National Institute for Occupational Safety and Health. For example, a filter at the N95 rating filters at least 95 percent of 0.3-micron (μm) particles, the N99 rating requires a filter to remove at least 99 percent, and the N100 rating filters at least 99.97 percent.

Figure 6A:
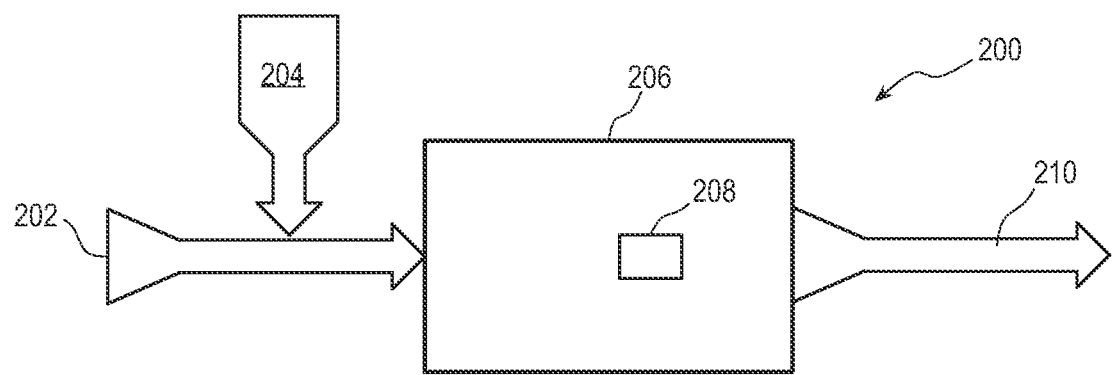
FIGS. 6a-6c illustrate testing multi-layer masks.
Figure 6B:
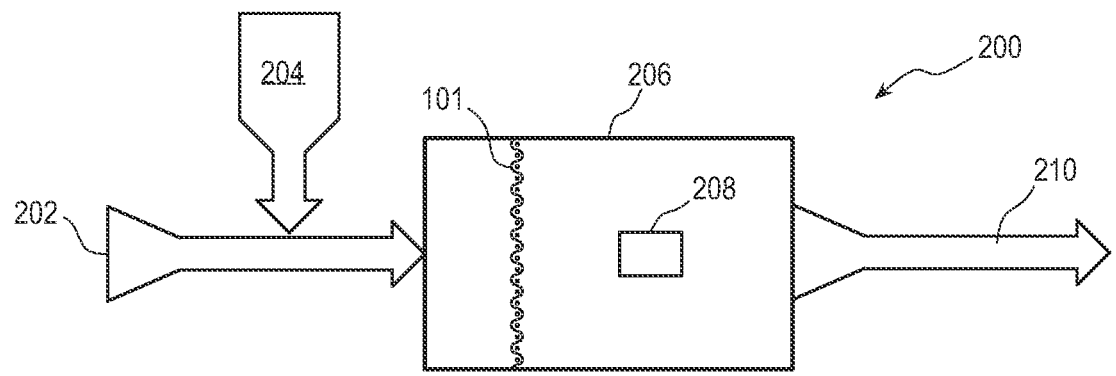
Figure 6C:
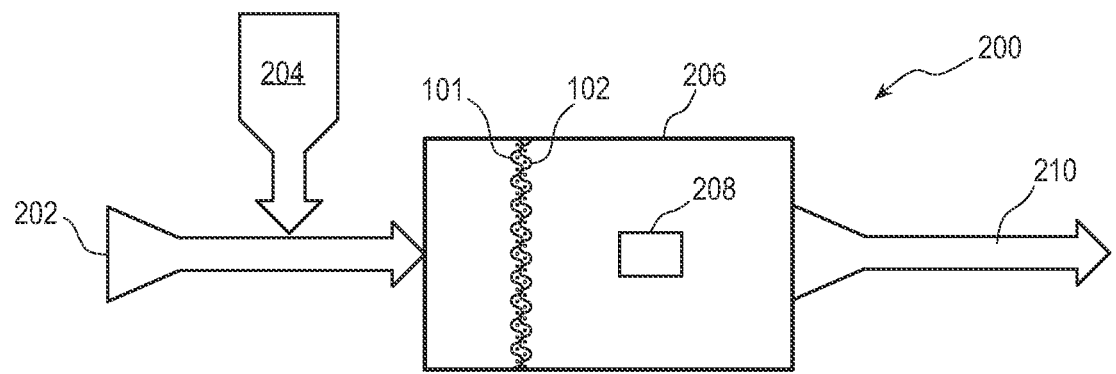

FIGS. 6a-6c show a system and process for designing a filter to a certain filtration standard. Given a particular desired filter layer configuration, testing can be performed with additional layers until a desired filtration level is achieved. A filter test machine 200 includes an air intake 202, a particle injector 204, a test chamber 206, a particle meter 208, and an air output 210.

First, a baseline is established for the number of particles without a filter in place. Test machine 200 is run without a filter in place as shown in FIG. 6a. An air pump or fan pulls air at a constant rate from intake 202 and through test chamber 206. Particles to be tested are inserted into the intake air stream by particle injector 204. Particle injector 204 can be any mechanism for injecting desired particles to test. The mechanism can be as simple as a lit cigarette within intake 202 to generate smoke that enters test chamber 206 along with the intake air. Generally, a more scientific mechanism will be used that generates a uniform particle size and count over time for each run of the test.

Particle meter 208 measures the concentration of particles in the air around the particle meter. In the configuration of FIG. 6a, particle meter 208 is used to count or estimate the number of particles released into test chamber 206 by particle generator 204 without a filter. The number without a filter is used as a baseline for subsequent filter testing.

FIG. 6b shows first filter layer 101 installed in test chamber 206 such that air flows through the first filter layer 101 prior to reaching particle meter 208. The same test from FIG. 6a is run again with first filter layer 101 in place. Particle meter 208 is used to count or estimate the number of particles that pass through first filter layer 101. For an N95 mask, the number of particles would be expected to fall by 95% between the two runs. However, typically a single woven filter will not be able to filter at 95%.

FIG. 6c shows both first filter layer 101 and second filter layer 102 disposed in test chamber 206. Second filter layer 102 is rotated relative to and physically contacts first filter layer 101 so that the combined filter is equivalent to a mask with two layers as shown in FIGS. 3a, 4a, and 4b. Particle meter 208 is used to count or estimate the number of particles from particle generator 204 that pass through both first filter layer 101 and second filter layer 102. Two filter layers may be enough to reach an N95 rating depending on the material used, the weave's thread count, and other factors. If experimentation reveals that N95 is not reached, a third filter layer can be added as shown in FIG. 3b before rerunning the test again.

The test shown in FIGS. 6a-6c can be iterated for additional layers and different offset angles until the desired filtration is achieved. The number of layers could be as high as 7-8 layers or more for achieving a high rating with poorly filtering fabric. For a given number of layers, the test of FIGS. 6a-6c can also be used to determine an optimal angular offset between the layers. Many options are given above, such as randomizing the order of the layer angles or allowing layers to align as long as intervening layers are at an angle.

Figure 7A:
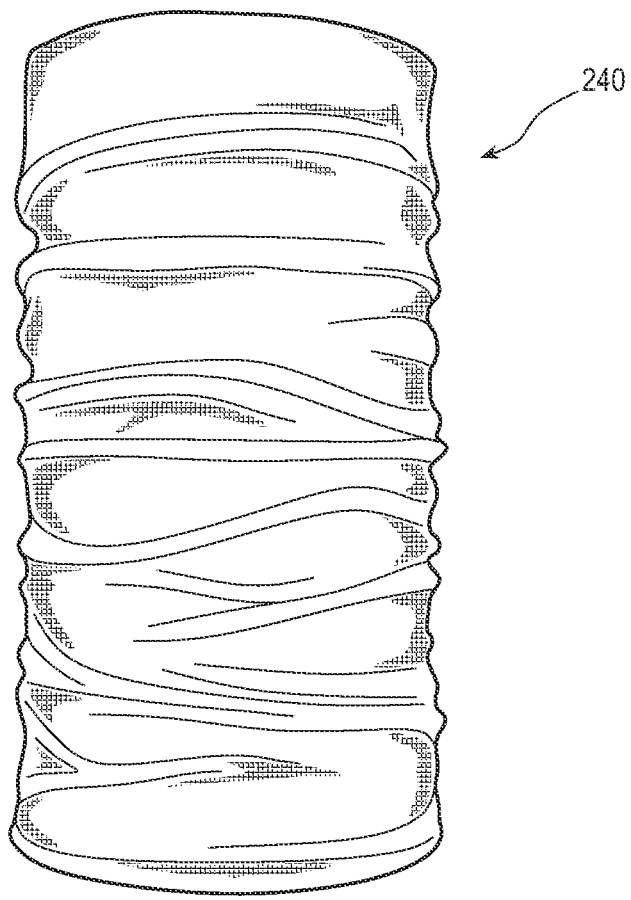
FIGS. 7a-7d illustrate masks that stretch when worn.
Figure 7B:
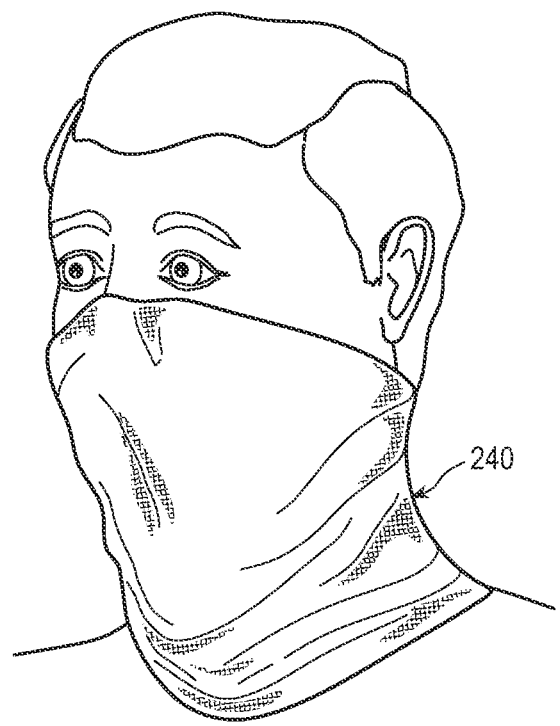

FIGS. 7a-7d illustrate testing of a neck gaiter styled face mask with stretchable material. FIG. 7a shows a neck gaiter 240. Neck gaiter 240 is a tube of fabric that is worn by inserting the user's head into the tube and pulling the entire neck gaiter down around the user's neck. Neck gaiter 240 is then pulled up and over the user's nose and mouth as shown in FIG. 7b. One issue that is present in many neck gaiters is that the material stretching over the user's neck and mouth reduces the effectiveness of the mask as a filter. Neck gaiter 240 may have been manufactured to the N95 standard, but is unlikely to maintain the standard when the fabric is stretched around a user's head.

Figure 7C:
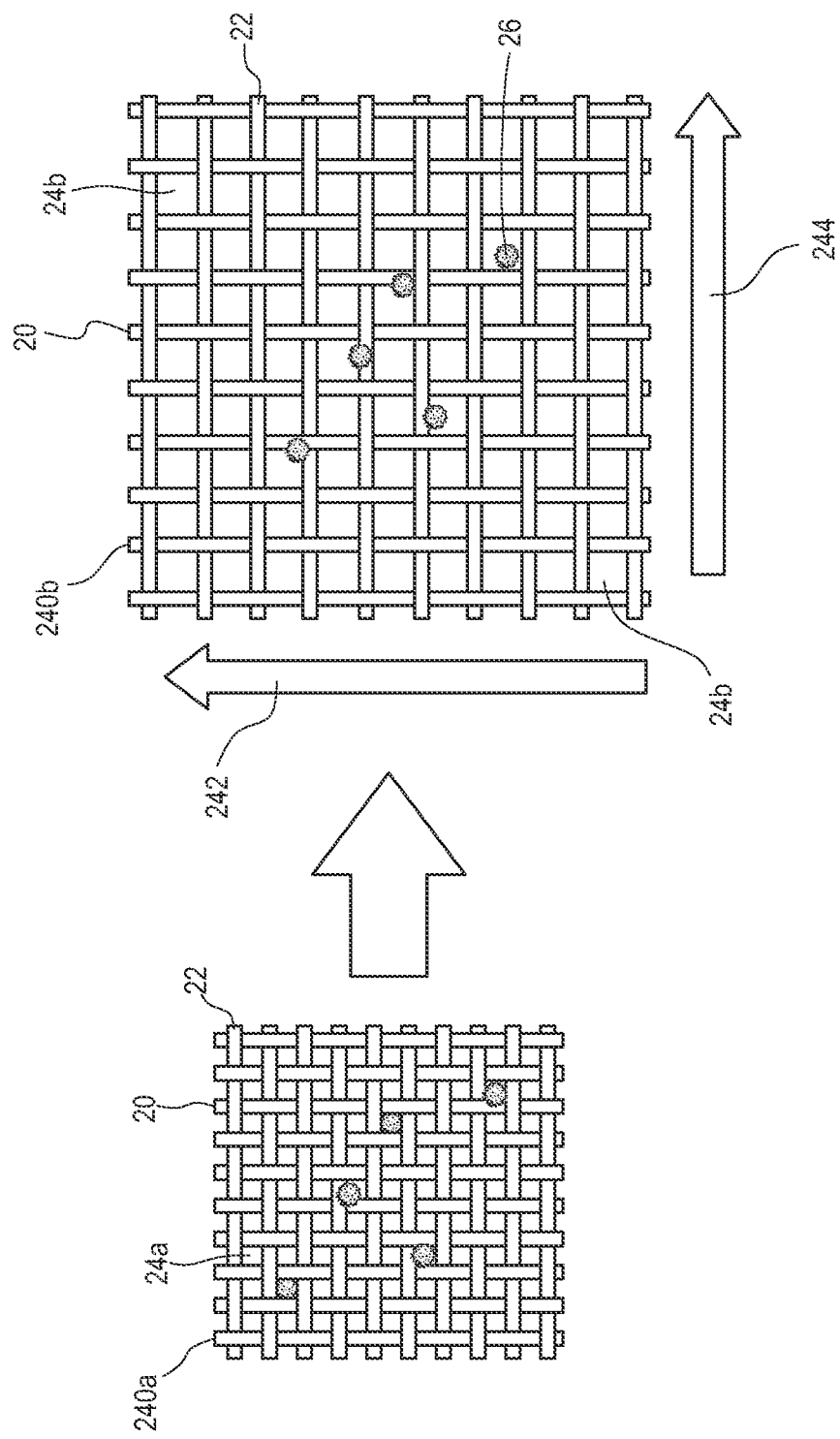

FIG. 7c shows a filter layer 240 being stretched. The left side of FIG. 7c shows filter layer 240 in a relaxed state, where holes 24a between warp yarns 20 and weft yarns 22 are about the same size as pathogens 26. A face mask could be made with a plurality of filter layers 240 and filter as well as one of the above illustrated masks. However, filter layer 240 is made of an elastic material that can be stretched.

The right side of FIG. 7c shows filter layer 240 stretched out as indicated by arrows 242 and 244. Stretching fabric 240 spreads out warp yarns 20 and weft yarns 22 further away from each other, and also thins the warp yarns and weft yarns. The result is that stretching out filter layer 240 increases the size of openings between the yarns significantly, as illustrated by openings 24b in FIG. 7c being larger than relaxed openings 24a. In the stretched-out state, filter layer 240 is much less likely to stop a pathogen 26. Even with a plurality of filter layers combined, stretching out the filter will significantly reduce the effectiveness of the filter material because even the combined openings are likely to be larger than pathogens 26.

Figure 7D:
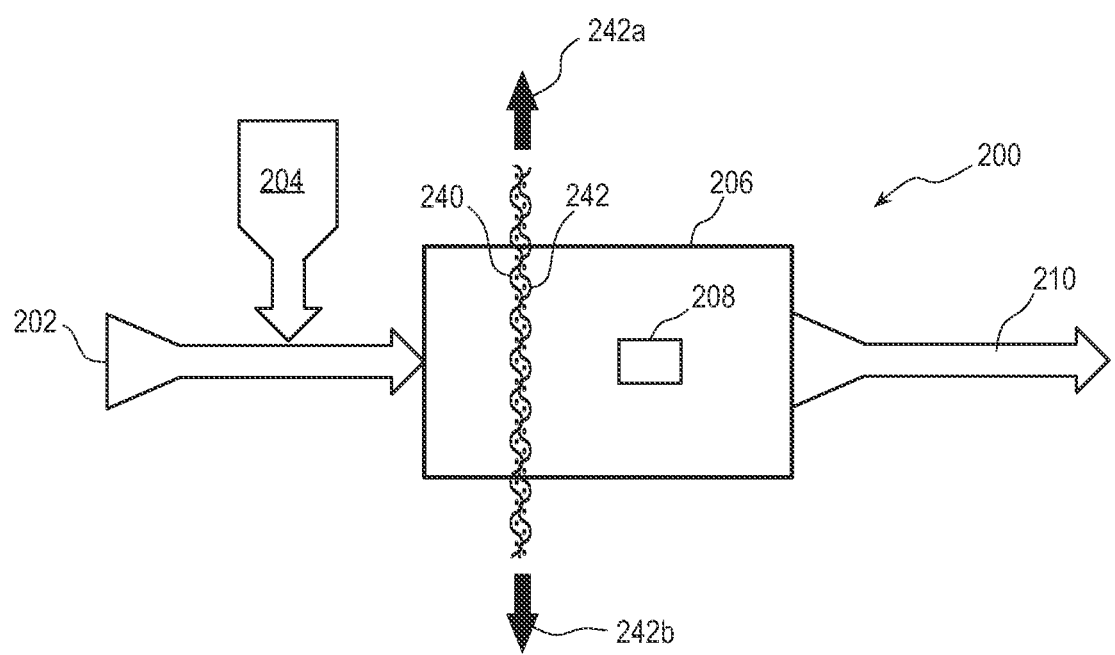

For face masks where the fabric is likely to be stretched when the mask is in use, the test from FIGS. 6a-6c should be run with the filter layers stretched to ensure proper filtration is maintained. FIG. 7d shows two elastic filter layers 240a and 240b disposed in test machine 200. Arrows 242a and 242b indicate vertical stretching of filter layers 240. Filter layers 240a and 240b would typically be stretched horizontally as well unless the mask being manufactured is worn in a way where only vertical stretching is likely.

To test filter layers 240 and determine the number of layers required to meet a certain filter standard, the amount of stretch expected should be determined. The expected amount of stretch can be determined by measuring the fabric both being worn and not being worn to determine the percentage increase in surface area. The fabric could also be magnified and viewed or photographed to measure the size of openings 24 in both states. A percentage stretch can be determined by comparing the worn and unworn masks. For instance, if the fabric surface area goes from 0.2 square meters to 0.25 square meters, the percentage stretch is calculated as 25%.

Once an expected stretch percentage of the fabric when in use is determined, filter layers 240 can be tested in test machine 200 with the same amount or greater of stretch. Testing in a stretched state will reveal the number of filter layers 240 that are required to reach the desired filtration level when the filter layers are actually worn. If testing reveals that a stretched mask requires four layers to reach the N95 filtration standard, then a 4-layer mask can be manufactured that still reaches N95 filtration when worn.

Testing can be performed with filter layers at a stretched state that is greater than expected when the final product is used. For instance, if a 25 percent stretch is expected, testing can be performed with filter layers 240 at a 40 percent stretch. Determining the requirement for an N95 mask at a greater than expected stretch level provides some additional tolerance in the final product. The final mask being manufactured will maintain N95 filtering even if stretched more than expected, e.g., if a large man wears a woman's size.

While one or more embodiments of the present invention have been illustrated in detail, the skilled artisan will appreciate that modifications and adaptations to those embodiments may be made without departing from the scope of the present invention as set forth in the following claims.

What is claimed:

1. A face mask, comprising:
   a first filter layer comprising a first yarn; and
   a second filter layer comprising a second yarn, wherein the second yarn is disposed at a non-right and non-parallel angle relative to the first yarn.

2. The face mask of claim 1, wherein the second filter layer is disposed in direct physical contact with the first filter layer for an entire footprint of the first filter layer.

3. The face mask of claim 1, further including a stitch extending through the first filter layer and second filter layer.

4. The face mask of claim 1, further including a third filter layer comprising a third yarn, wherein the third yarn is disposed at a non-right and non-parallel angle relative to both the first yarn and second yarn.

5. The face mask of claim 4, wherein the third yarn is disposed at a 30-degree angle relative to the second yarn and a 60-degree angle relative to the first yarn.

6. The face mask of claim 5, further including a fourth filter layer comprising a fourth yarn, wherein the fourth yarn is disposed at a 30-degree angle relative to the third yarn.

7. The face mask of claim 1, wherein the first filter layer and second filter layer are elastic.

8. A filter media, comprising:
   a first filter layer disposed at a first angle; and
   a second filter layer disposed at a second angle different from the first angle.

9. The filter media of claim 8, further including disposing the second filter layer in physical contact with the first filter layer.

10. The filter media of claim 8, further including a third filter layer disposed at a third angle different from the first angle and second angle.

11. The filter media of claim 10, further including a fourth filter layer disposed at a fourth angle different from the first angle, second angle, and third angle.

12. The filter media of claim 10, further including a fourth filter layer disposed at the first angle, wherein the second filter layer and third filter layer are disposed between the first filter layer and fourth filter layer.

13. The filter media of claim 8, further including a stitch extending through the first filter layer and second filter layer.

14. The filter media of claim 8, wherein the first filter layer and second filter layer are elastic.

15. A method of making a filter media, comprising:
    providing a first woven filter layer;
    providing a second woven filter layer; and
    disposing the second woven filter layer on the first woven filter layer with the second woven filter layer rotated relative to the first woven filter layer.

16. The method of claim 15, further including testing the first woven filter layer and second woven filter layer using a particle meter to determine a level of filtration of the filter media.

17. The method of claim 16, further including stretching the first woven filter layer and second woven filter layer prior to testing.

18. The method of claim 15, further including stitching the second woven filter layer to the first woven filter layer.

19. The method of claim 18, further including:
    stitching around a perimeter of the first woven filter layer and second woven filter layer; and
    stitching a location within the perimeter.

20. The method of claim 15, further including disposing a third woven filter layer on the first woven filter layer and second woven filter layer, wherein the third woven filter layer is rotated relative to the first woven filter layer and second woven filter layer.

* * * * *